United States Patent [19]

Kecskeméthy et al.

[11] Patent Number: 4,522,963

[45] Date of Patent: Jun. 11, 1985

[54] PROCEDURE FOR CURING UNSATURATED POLYESTER RESINS

[75] Inventors: Géza Kecskeméthy; István Kovácsay; László Magdányi, all of Budapest, Hungary

[73] Assignee: Müanyagipari Kutató Intézet, Budapest, Hungary

[21] Appl. No.: 541,433

[22] Filed: Oct. 13, 1983

[51] Int. Cl.$^3$ ............................................. C08L 67/06
[52] U.S. Cl. ................................. 523/510; 523/505; 523/507; 523/508; 523/511; 524/325; 524/358; 525/21; 525/27
[58] Field of Search ............... 523/510, 511, 507, 505, 523/508; 524/325, 358; 525/23, 27, 25, 21

[56] References Cited

U.S. PATENT DOCUMENTS 3,382,296 5/1968 Tenquist ............................ 525/17
4,232,136 11/1980 Kovácsay .......................... 525/43
4,359,570 11/1982 Davis ................................ 525/507

FOREIGN PATENT DOCUMENTS 798133 1/1981 U.S.S.R. ............................ 524/358

Primary Examiner—John C. Bleutge
Assistant Examiner—Patricia Short
Attorney, Agent, or Firm—Keil & Weinkauf

[57] ABSTRACT

The invention is a process for monitored cross-linking of unsaturated polyester resins in the presence of a metal-ion-containing accelerator and an organic peroxide initiator, complemented by promotor in some cases. According to this process, the cross-linking is carried out in the presence of one of the compounds from the group consisting of alizarin, sodium alizarinesulfonate, 3-nitroalizarin, chinizarine, or purpurin, where the substituents are H atoms or OH, $NO_2$, $SO_3H$, or $SO_3Na$ groups with the restriction that at least one of them should be other than H, which is present in a ratio of from 0.005 to 0.5, preferably 0.01 to 0.1 percent (mass/mass), compared to the mass of the polyester resin, and cross-linking is trailed by the color change in the system. The invention permits all of the chemical-technological processes involved in the processing of unsaturated polyester resins to be monitored visually.

4 Claims, No Drawings

PROCEDURE FOR CURING UNSATURATED POLYESTER RESINS

The invention relates to a process for curing unsaturated polyester resins by using an organic accelerator containing metal-ion and an organic peroxide initiator.

It is known that unsaturated polyester resins are cross-linked or cured by organic peroxide initiators—generally named as catalysts—in every case. For acceleration of the process, mostly metal-ion-containing compounds are used. The initiators and accelerators incorporated into the resin do not cause any colouration effect, thus neither their presence nor the extent of their homogeneity can be visualised during and after the curing process.

The prescribed amount of initiator and accelerator is essential to the complete curing of the polyester resin under the given technological conditions. If any of them is missing, rejections would be produced. Incompletely homogenized initiator and accelerator may cause, due to incompletely or excessively rapidly polymerized regions having high internal stresses, defects in the end-product. In the case of the conventional colourless initiator/accelerator systems, the proper curing can only be established by touching or by complicated techniques before removal of the polyester part from the mould.

Use of various coloured indicators in cross-linking of unsaturated polyester resins is also known. E.g. the U.S. Pat. No. 3,382,296 refers to the incorporation of p-phenylenediamine based compounds into the unsaturated polyester resin causing colour changes as the originally colourless organic peroxide gets into contact with the resin, whereby the presence of the initiator becomes visible.

A more recent and improved procedure is described by the U.S. Pat. No. 4,232,136 providing the admixing of thiazine, indamine, oxazine, or azine type indicators to the organic peroxide initiator itself. The patent specifications referred to aim at the detection by colour effects of such an important step of polyester processing as the incorporation of initiator.

No procedure is known, however, which could trail the cross-linking of polyester resins throughout all of its technological steps by using colour indicators. It is known that cross-linking of unsaturated polyester resins requires in most cases accelerators, in addition to the organic peroxide initiators, since it permits the processing at lower temperatures, on the one hand, and reduces the amount of the more expensive initiators, on the other hand. Considering the fact that the accelerator brings about no cross-linking of the resin, it only promotes the decomposition of the initiator and the formation of radicals, it can be incorporated into the resin at any stage of the processing. In many cases, the required amount of accelerator is admixed to the resin even by the manufacturer of the unsaturated polyester. The accelerator, generally some kind of an organometallic compound, has no colour effect and thus it is not perceptible in the resin. For this reason, it may happen very often that the processor does not know whether his resin contains accelerator or not. Much rejects and defects are attributed to admixing only an organic peroxide to the resin containing no accelerator. Such a resin is cross-linked at an extremely low rate and incompletely, producing useless parts. In mechanized processing, such as continuous sheet moulding or filament winding, separate pumps are delivering the resin, the accelerator, and the initiator. A failure of the pump delivering the accelerator does not immediately reveal the lack of the accelerator in the resin. It may cause some 100 m$^2$ of reject e.g. in a continuous production of corrugated sheets.

It would be reasonable, therefore, to generate a colour effect in accordance with the feature of polyester processing so that a suitable compound should be admixed either to the polyester resin, where it results in a colour change when the generally used metal-ion-containing accelerators are incorporated, or to the accelerator itself. Even in the latter case, the colour effect appears at the moment of incorporation of the accelerator into the resin. It is advisable that the colour disappears in the course of cross-linking in order to give the original natural colour of the resin to the end-product. Up to now, such kind of procedure has not been known.

The invention aims at developing a process providing the indication of the presence of an accelerator in the polyester resin by a colour effect that disappears during cross-linking and thus does not influence the colour of the product.

The invention is based on the recognition that the compounds alizarin (C.I. No. 58000), sodium alizarinesulfonate (C.I. No. 58005), 3-nitroalizarin (C.I. No. 58015), chinizarine (C.I. No. 58050), or purpurin (C.I. No. 58205), make the polyester resins coloured as a metal-ion-containing accelerator is admixed to them whereas the colour disappears in the course of the cross-linking induced by organic peroxide initiators. The invention is also based on the recognition that compounds such as alizarin, sodium alizarinesulfonate, 3-nitroalizarin, chinizarine, or purpurin produce colour effect with metal-ion-containing accelerators, too. Consequently, the compounds listed above can be admixed directly to the accelerators or they can be incorporated into the polyester resin when the accelerator is introduced afterwards. Finally, it has been recognized as well that the compounds listed above can be used in the presence of any organic peroxide initiator, including coloured ones.

Consequently, the invention is a process for monitored cross-linking of unsaturated polyester resins in the presence of metal-ion-containing accelerators and organic peroxide initiators, with a possible application of a promoter. In compliance with the process of the invention the polyester resin is cross-linked in the presence of alizarin, sodium alizarinesulfonate, 3-nitroalizarin, chinizarine or purpurin, which is present in a ratio of from 0.005 to 0.5 percent, preferably 0.01 to 0.1 percent, compared to the mass of polyester resin, while the cross-linking is trailed by means of the colour change in the reaction mixture.

This kind of processing of the polyester resin provides the control of homogeneous distribution of the involved materials both in manual and in mechanized mixing and processing while, on the other hand, the presence of the accelerator can easily be ascertained both in batch (manufacturing glass-fibre-reinforced polyester parts) and in continuous (pultrusion, corrugated and flat sheet moulding) processes since the polyester resin containing alizarin, sodium alizarinesulfonate, 3-nitroalizarin, chinizarine, or purpurin is deeply coloured in the presence of the accelerator.

Alizarin (C.I. No. 58000), sodium alizarinesulfonate (C.I. No. 58005), 3-nitroalizarin (C.I. No. 58015), chinizarine (C.I. No. 58050), or purpurin (C.I. No. 58205)

can be advantageously used to make the polyester resins coloured as a metal-ion-containing accelerator is admixed to them.

The process of the invention can be applied in every case where metal-ion-containing compounds known per se are involved in the cross-linking process for acceleration of the polymerization. It concerns about 90 percent of the polyester processing.

In a favourable execution of the process of the invention, the compound selected from the group consisting of alizarin, sodium alizarinesulfonate, 3-nitroalizarin, chinizarine, and purpurin is admixed to the solution of the conventional cobalt naphthenate-based accelerator, preferably the sodium salt of alizarinesulphonic acid. In this case, the accelerator solution will be very dark violet-red. When this solution is admixed to the unsaturated polyester resin, it becomes transparent red. During the cross-linking, this colour is disappearing. If the cross-linking is conducted using the coloured initiator according to the aforementioned U.S. patent where the initiator is e.g. blue, the previously red resin changes into violet due to the initiator but, in the course of cross-linking, even this new colour disappears.

Another favourable performance of the process of the invention is the admixing of the compound selected from the group consisting of alizarin, sodium alizarinesulfonate, 3-nitroalizarin, chinizarine, and purpurin, namely the sodium salt of alizarinesulfonic acid, to the polyester resin itself. It leads to a hardly visible discolouration. If, however, the resin containing this compound is mixed with a conventional metal-ion-containing accelerator, such as cobalt naphthenate solution, at a usual rate of the polyester technology (generally at 0.2 to 3 percent m/m) at any time afterwards, the dark red colour appears soon and remains visible until the cross-linking has been completed. The term "m/m" as used in this application indicates "mass/mass." Similarly to the former instance, coloured initiator can be applied also in this case.

Obviously, in the process of the invention, the type of the coloured or colourless organic peroxide used for the cross-linking is indifferent.

Our invention is, therefore, the first that permits the detection of the presence of the accelerator, i.e. the visual monitoring of all technological steps of the cross-linking process when coloured initiator is used.

An essential step of every polyester processing technologies is the preparation of a completely homogenous mixture of the resin, accelerator, and initiator. In the process of the invention, the strong colour effect of the compound selected from the group consisting of alizarin, alizarinesulfonate, 3-nitroalizarin, chinizarine, and purpurin indicates not only the presence but also the homogeneity of distribution and, by the estimation of the colour intensity, even the approximate concentration of the accelerator which are crucial with respect to the quality of the end-product. This provides benefits to the processors which have not yet been achieved by any other techniques. One of the special advantages involved in the process of the invention is that the resin manufacturer is able to trade a kind of resin containing a compound from the group consisting of alizarin, sodium alizarinesulfonate, 3-nitroalizarin, chinizarine, and purpurin, capable of indicating the accelerator to be present. In fact, he can follow the usual practice of marketing a resin composition containing the accelerator in advance, with the great advantage that the resin containing both the compound of the invention and the accelerator is inherently coloured which offers the possibility that the composition can be qualified whether it contains accelerator or not even after several years.

The invention is advantageous also for the manufacturers of accelerators since the accelerator can be produced in admixture with a compound selected from the group consisting of alizarin, sodium alizarinesulfonate, 3-nitroalizarin, chinizarine, and purpurin in coloured form and thus it can be purchased more favourably to the processors because of the aforementioned advantages.

The advantages can be summarized as follows:

(a) The compounds of the group consisting of alizarin, sodium alizarinesulfonate, 3-nitroalizarin, chinizarine, and purpurin, as admixed to the polyester resin, indicate the incorporation of the accelerator by a colour effect.

(b) The compounds of the group consisting of alizarin, sodium alizarinesulfonate, 3-nitroalizarin, chinizarine, and purpurin, as admixed to the accelerator, indicate the incorporation of the accelerator by a colour effect.

(c) The colour effect generated by using the process of the invention disappears as the cross-linking induced by any kind, of organic peroxide initiators has been completed.

(d) Any of the cases (a) and (b) is suitable for the cross-linking by coloured organic peroxides since the two colours are combined into a distinctive third one whereby the presence of both essential components can be trailed and this colour is also disappearing during cross-linking.

For illustrating the process of the invention the following examples are given:

EXAMPLE 1

For manufacturing glass-fibre-reinforced polyester sheets, 2 kg of unsaturated ortho-phthalic acid based polyester solution containing 600 g of styrene is weighed into a vessel. Previously, toluene solution of 40 g cobalt naphthenate (containing 1 percent m/m of Co) is mixed with 0.4 g of sodium alizarinesulfonate at ambient temperature. This dark violet-red accelerator solution is admixed to the polyester resin which is coloured into violet-red. Then 20 g of 50 percent (m/m) solution of methylethylketone peroxide initiator is added to the resin and the composition is stirred up to complete homogeneity. One third part of the resin compound is brushed onto a glass plate previously treated with a mould release agent, evenly distributed on a surface area of 1 $m^2$. The resin film is covered with 1 $m^2$ of glass mat having a surface density of 450 $g/m^2$ then it is impregnated by the half of the remained resin. Finally, another glass mat of identical size and quality is placed on the system and the remained resin is brushed uniformly onto the top. The laminated semiproduct is intensively violet-red during the gelation time of about 30 minutes, then starts fading and reaches colourlessness in 2-3 hours after admixing (if conducted at 20°-25° C.) indicating that curing has been completed.

EXAMPLE 2

For manufacturing filament-wound pipe of glass-fibre-reinforced polyester resin, a solution of isophthalic acid based polyester resin containing 40 percent (m/m) of styrene is delivered into the impregnating trough by a metering pump. Beams of glass roving are drawn through the polyester resin by means of a pulling device. The glass roving impregnated with the resin in the trough passes onto a winding mandrel which is continuously rotated in order to form the desired pipe wall thickness. A metering pump delivers 10 g of 40 percent solution of acetylacetone peroxide initiator and an accelerator solution consisting of 5 g of toluene solution of cobalt naphthenate at a rate of 0.05 g of Co++ and 0.5 g of chinizarine in term of 1 kg of resin.

The chinizarine-containing accelerator colours the polyester resin bright red before impregnating the glass roving. This colour starts fading in the roving after about 40 minutes and is getting to complete decolouration in the course of the cross-linking in 2-3 hours at 20°-25° C.

EXAMPLE 3

For manufacturing glass-fibre-reinforced corrugated sheets, a solution of ortho-phthalic acid based polyester resin containing 30 percent (m/m) of styrene and 10 percent (m/m) of methyl methacrylate is delivered by a metering pump onto a cellophane film continuously drawn by a corrugated sheet machine at such a rate that the glass mat delivered continuously in the subsequent stage be impregnated throughout. 12 g of 50-percent (m/m) solution of methylethylketone peroxide initiator and a mixture of 10 g of toluene solution of cobalt naphthenate containing 0.1 g of Co++ with 0.1 g of 3-nitroalizarin are admixed to 1 kg of resin by metering pumps again.

The polyester resin is coloured to bright red-brown by the accelerator solution. After the resin and the glass mat have passed through the impregnating zone of the corrugated sheet machine, the glass mat impregnated with the liquid resin becomes bright red-brown.

The glass mat impregnated with the resin is fed into the curing zone between cellophane films where the resin is cross-linked at 80° C. in 5 minutes as indicated by decolouration.

EXAMPLE 4

20 g of sodium alizarinesulfonate is admixed to 200 kg of isophthalic acid based unsaturated polyester resin solution containing 40 percent (m/m) of styrene in such a way that a dense paste is produced with a small amount of resin solution which is then diluted by the remained part of the resin. After dissolution the composition is light yellow. 2 kg of toluene solution of cobalt naphthenate (containing 1 percent m/m of Co) are added to the above composition which becomes pink in a short time. About 24 hours after admixing the cobalt accelerator the colour change is completed, reaching a violet-red colour. This bright violet-red colour indicates well both for the manufacturer and for the processor that the polyester resin treated in the above way contains cobalt accelerator.

We claim:

1. A process for monitored cross-linking of unsaturated polyester resins in the presence of a metal-ion-containing accelerator and an organic peroxide initiator which comprises conducting the cross-linking in the presence of a color-producing compound selected from the group consisting of alizarin, sodium alizarinesulfonate, 3-nitroalizarin, chinizarine, or purpurin, in a ratio of from 0.005 to 0.5 percent mass/mass compared to the mass of the polyester resin, and tracking the cross-linking by means of the color change in the reaction mixture.

2. The process of claim 1, wherein the cross-linking of the unsaturated polyester resin is carried out in the presence of alizarin.

3. The process of claim 1, wherein the amount of colour-producing compound that is present is from 0.01 to 0.1 percent mass/mass compared to the mass of the polyester resin.

4. The process of claim 1 wherein the amount of the compounds selected from the group consisting of alizarin, sodium alizarine sulfonate, 3 nitroalizarine, chinizarine and purpurin is from 0.01 to 0.1 percent (m/m) calculated on the mass of the polyester resin.

* * * * *